(12) United States Patent
Park (10) Patent No.: US 7,734,806 B2
(45) Date of Patent: Jun. 8, 2010

(54) COMPATIBLE PROGRESSIVE DOWNLOAD METHOD AND SYSTEM

(75) Inventor: Jin Park, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 246 days.

(21) Appl. No.: 11/603,624

(22) Filed: Nov. 22, 2006

(65) Prior Publication Data

US 2007/0130210 A1 Jun. 7, 2007

(30) Foreign Application Priority Data

Nov. 22, 2005 (KR) ............ 10-2005-0111670

(51) Int. Cl.
*G06F 15/16* (2006.01)
(52) U.S. Cl. .................... 709/232; 709/231
(58) Field of Classification Search ............ 709/232, 709/32
See application file for complete search history.

(56) References Cited

U.S. PATENT DOCUMENTS

| | | | |
|---|---|---|---|
| 5,874,986 A * | 2/1999 | Gibbon et al. | 725/134 |
| 5,874,997 A * | 2/1999 | Haigh | 375/240.25 |
| 6,370,543 B2 * | 4/2002 | Hoffert et al. | 707/104.1 |
| 6,665,751 B1 * | 12/2003 | Chen et al. | 710/52 |
| 7,133,486 B2 * | 11/2006 | Zhang et al. | 375/377 |
| 2002/0116533 A1 * | 8/2002 | Holliman et al. | 709/246 |
| 2004/0267952 A1 | 12/2004 | He et al. | |
| 2005/0160470 A1 * | 7/2005 | Strauss | 725/115 |
| 2006/0104314 A1 * | 5/2006 | Miyaji et al. | 370/521 |
| 2006/0109870 A1 * | 5/2006 | Miyaji et al. | 370/537 |
| 2006/0184972 A1 * | 8/2006 | Rafey et al. | 725/80 |

FOREIGN PATENT DOCUMENTS

| | | |
|---|---|---|
| WO | WO 03/084233 | 10/2003 |
| WO | WO 2004/077790 | 9/2004 |
| WO | WO 2005/039131 | 4/2005 |

* cited by examiner

*Primary Examiner*—Patrice Winder
*Assistant Examiner*—Minh-Chau Nguyen
(74) *Attorney, Agent, or Firm*—The Farrell Law Firm, LLP (57) ABSTRACT

Disclosed is a compatible progressive download method and system. In the system, a terminal acquires format information of a remote content file prior to download of the content file and sets a progressive download environment based on the acquired format information. The terminal then simultaneously downloads data in a position corresponding to the format information from a server and plays the downloaded data. At this time, receipt of each media data, i.e., audio data and video data, is performed independently and a progressive download is performed in such a way that media data that is smaller than its threshold during playback is downloaded to fill a buffer. This progressive download method can be applied to downloading of content in other formats in addition to formats defined by the $3^{rd}$ Generation Partnership Project (3GPP). Therefore, it is not necessary for the server to modify the format of content according to the 3GPP standard.

17 Claims, 9 Drawing Sheets

```
⊟ vfuk.3gp ~135
  ├ ftyp
  ⊞ moov ~140
  ├ free
  ├ free
  ├ mdat
  ⊞ mdat ~145
```

| # | type | length (ms) | frames | bytes | largest | header | format | dim | rate |
|---|------|-------------|--------|-------|---------|--------|--------|-----|------|
| 0 | video | 49400 | 738 | 544285 | 4452 | 28 | ISO/IEC 14496-2(MPEG-4) | 176x144 | 0 |
| 1 | audio | 49319 | 1062 | 197163 | 305 | 2 | MPEG-4 AAC | | |
| 2 | unknown | 49226 | 530 | 33920 | 64 | 0 | | | |
| 3 | unknown | 49400 | 738 | 118424 | 816 | 0 | | | |

COMPATIBLE PROGRESSIVE DOWNLOAD METHOD AND SYSTEM

PRIORITY

This application claims priority under 35 U.S.C. §119 to an application entitled "Compatible Progressive Download Method And System" filed in the Korean Intellectual Property Office on Nov. 22, 2005 and assigned Serial No. 2005-111670, the contents of which are incorporated herein by reference.

BACKGROUND OF THE INVENTION

1. Field of the Invention

The present invention generally relates to a progressive download method and system, and in particular, to a compatible progressive download method and system using meta data.

2. Description of the Related Art

In general, a content download service refers to a service which enables a Web client to download specific multimedia content from a server, store the downloaded multimedia content in its local memory, and repeatedly play the stored multimedia content. Since a conventional download methods use a Hyper Text Transfer Protocol (HTTP) and perform reliable data transmission/reception through a Transmission Control Protocol (TCP) transmission, data loss is minimized and high display quality can be provided once downloading has been completed. However, according to conventional download methods, content that is being downloaded cannot be played until the downloading has been completed.

Figure 2A:
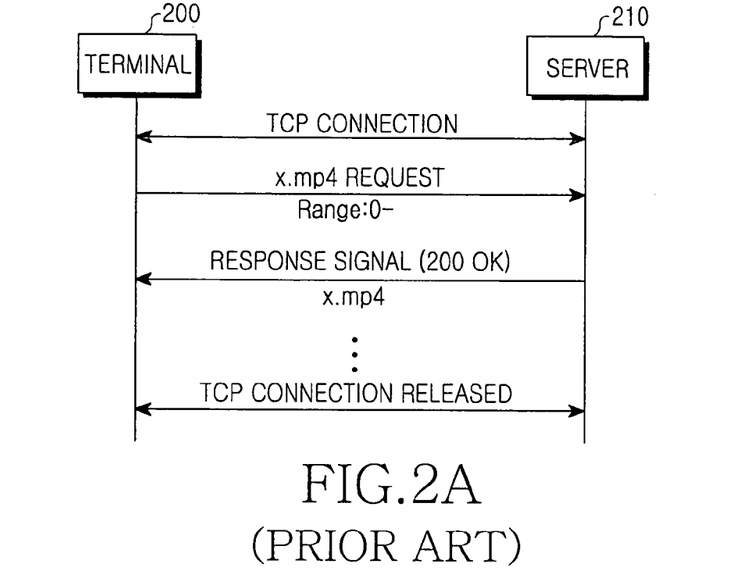
FIG. 2A is a flow diagram illustrating a data transmission process according to a conventional download method using the TCP.

A data transmission process according to conventional download methods using the TCP will be described with reference to FIG. 2A. In FIG. 2A, when a terminal 200 and a server 210 are TCP connected through a network, the terminal 200 transmits an x.mp4 request for an mp4 format file having a specific range to the server 210. Upon receipt of a response signal 200 OK to the x.mp4 request, the terminal 200 downloads a corresponding x.mp4 file and releases TCP connection. In this way, data transmission/reception is performed.

Figure 2B:
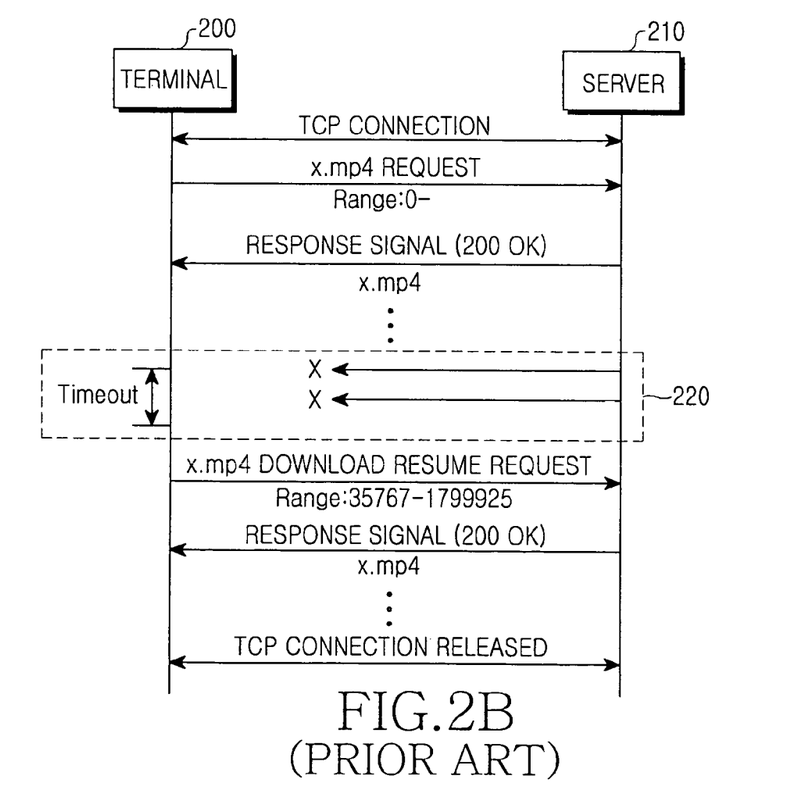
FIG. 2B is a flow diagram illustrating a data transmission process according to a conventional resumable download method.

A data transmission process according to a conventional resumable download method will be described with reference to FIG. 2B. In FIG. 2B, downloading of a file is interrupted by an internal or external factor. In this case, after a timeout as indicated by 220, a request for resuming the downloading of the file is transmitted to the server 210. Since the terminal 200 knows the range of the file that has been downloaded so far (i.e., before the time out), the terminal 200 informs the server 210 of the range of the file that has been downloaded to download the remaining range of the file.

A streaming method regarded as a representative real-time application in terms of data transmission through a network uses a User Datagram Protocol (UDP) transmission having no retransmission capability at a specific transmission rate. The streaming method performs real-time transmission/reception through UDP transmission that requires a more complex and unreliable control process than content downloading, and has a high possibility of experiencing errors and/or data loss. Since streaming data having a data loss is stored in a local memory, quality that is equivalent to that of the original content cannot be provided when the stored data is played, if there is a data loss.

As an alternative to the foregoing two methods, there is a progressive download method suggested by the 3$^{rd}$ Generation Partnership Project (3GPP). The progressive download method is targeted for a *.3gp format file basically based on MPEG4 (Motion Picture Experts Group-4) and is defined in the 3GPP TS26.244 standard. The progressive download method can play content that is being downloaded, thereby ensuring high display quality without a data loss and providing a real-time service. With these advantages, some European General Packet Radio Service (GPRS) and Universal Traffic Management Systems (UTMS) network operators are actively introducing the progressive download method.

However, the progressive download method has the following constraints.

First, the streaming method uses the UDP transmission having no retransmission at a specific transmission rate, whereas the progressive download method uses the reliable transmission protocol TCP download and storage of storing time-insensitive files as opposed to real-time playback of files. For example, in the progressive download method, downloading may be temporarily interrupted due to flow control and retransmission provided by TCP transmission, resulting in degradation of a real-time feature in a real-time application.

The progressive download method has a constraint in the creation of content in view of data storing. The 3GPP TS 26.244 V6.0.0 standard prescribes a 3gp file format for a progressive download service. In the 3GPP TS 26.244 V6.0.0 standard, a profile of a file is prescribed as '3gr6', a 'moov' box in the 3gp file must be positioned immediately after an 'ftyp' box, and the two boxes (or atoms) must be positioned at the head of the 3gp file. In addition, all media tracks must be interleaved by an interval of 1 second or less.

Figure 1A:
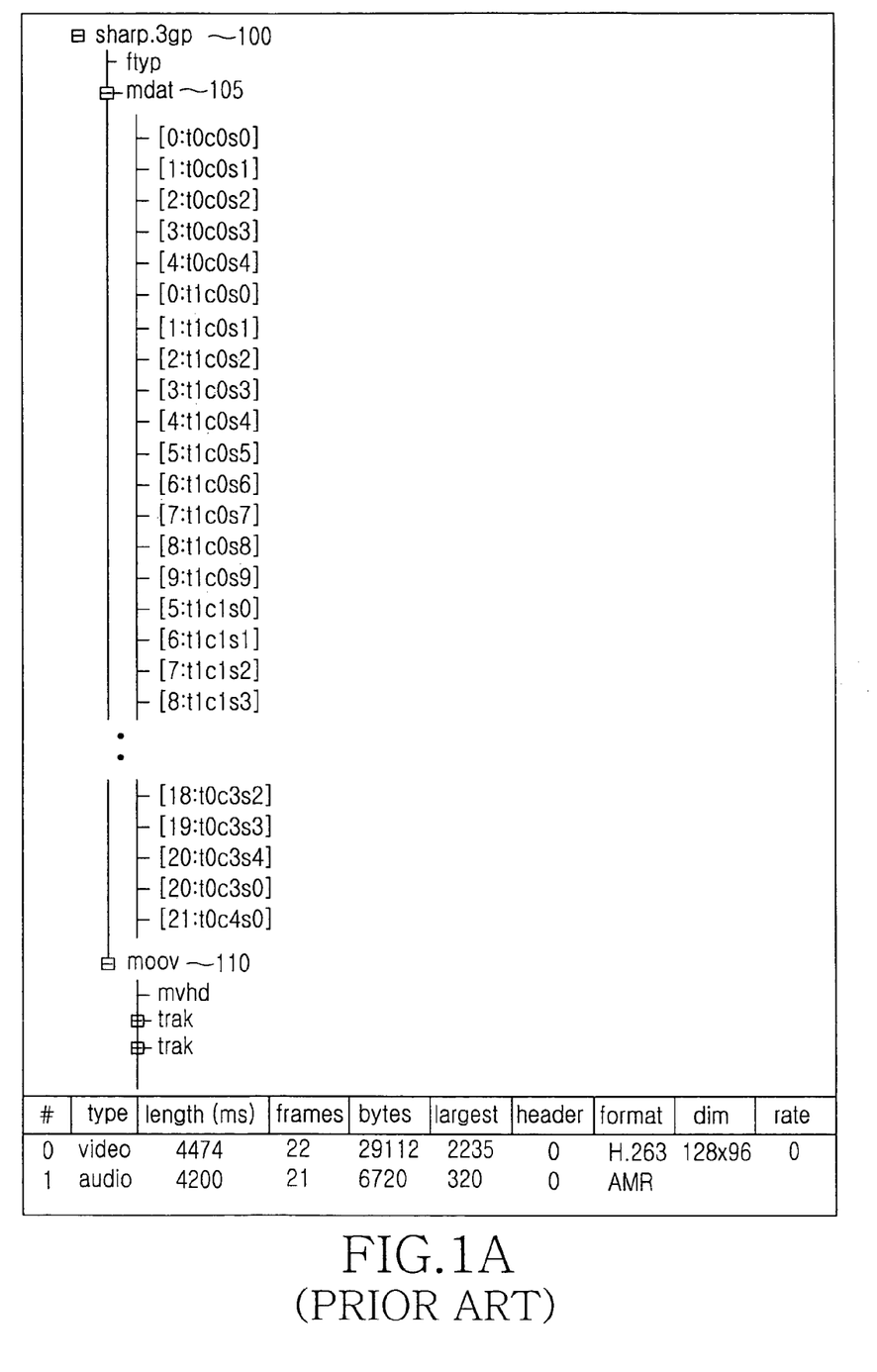
FIGS. 1A through 1C are diagrams illustrating various formats of a general MPEG4 content file.
Figure 1B:
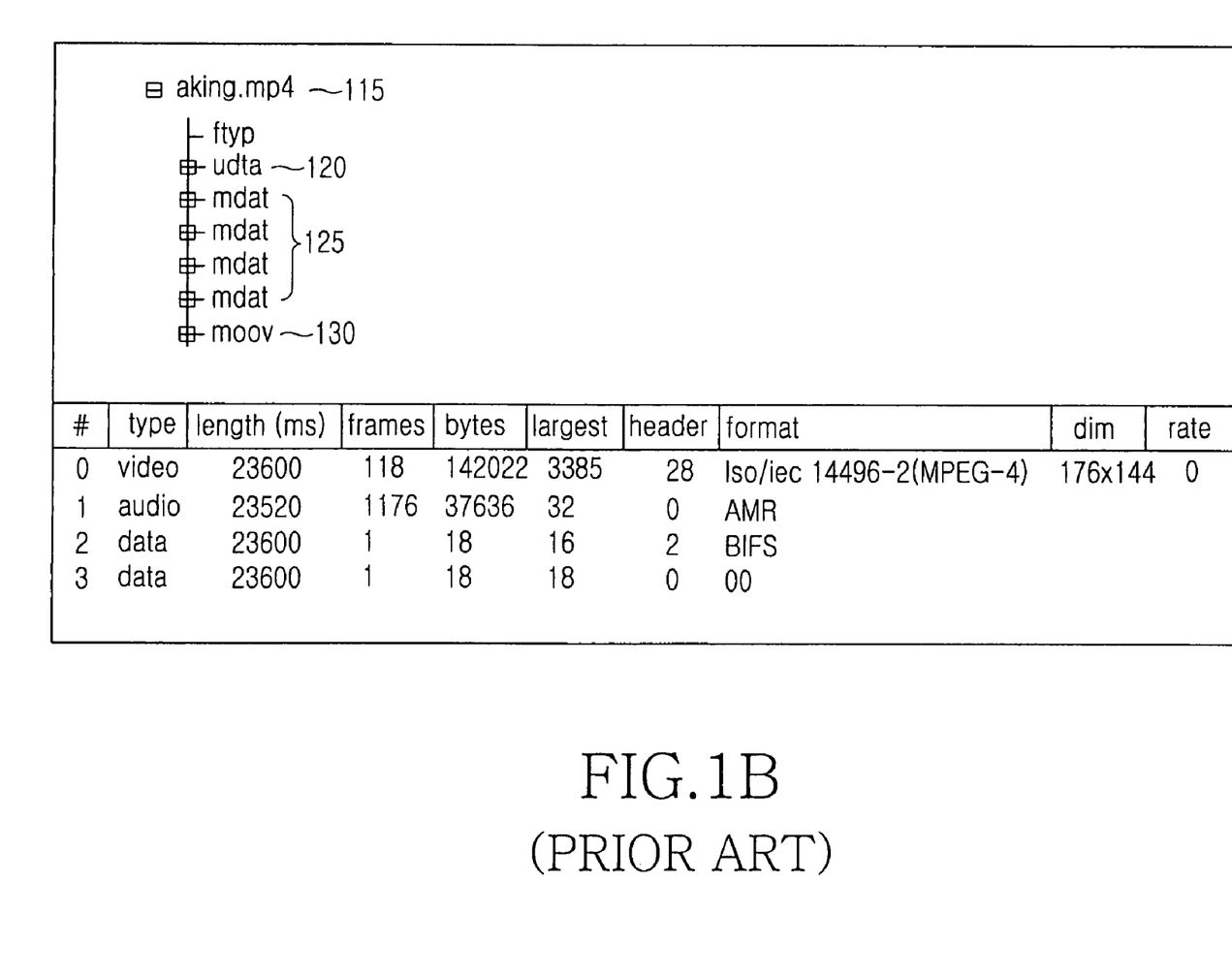
Figure 1C:
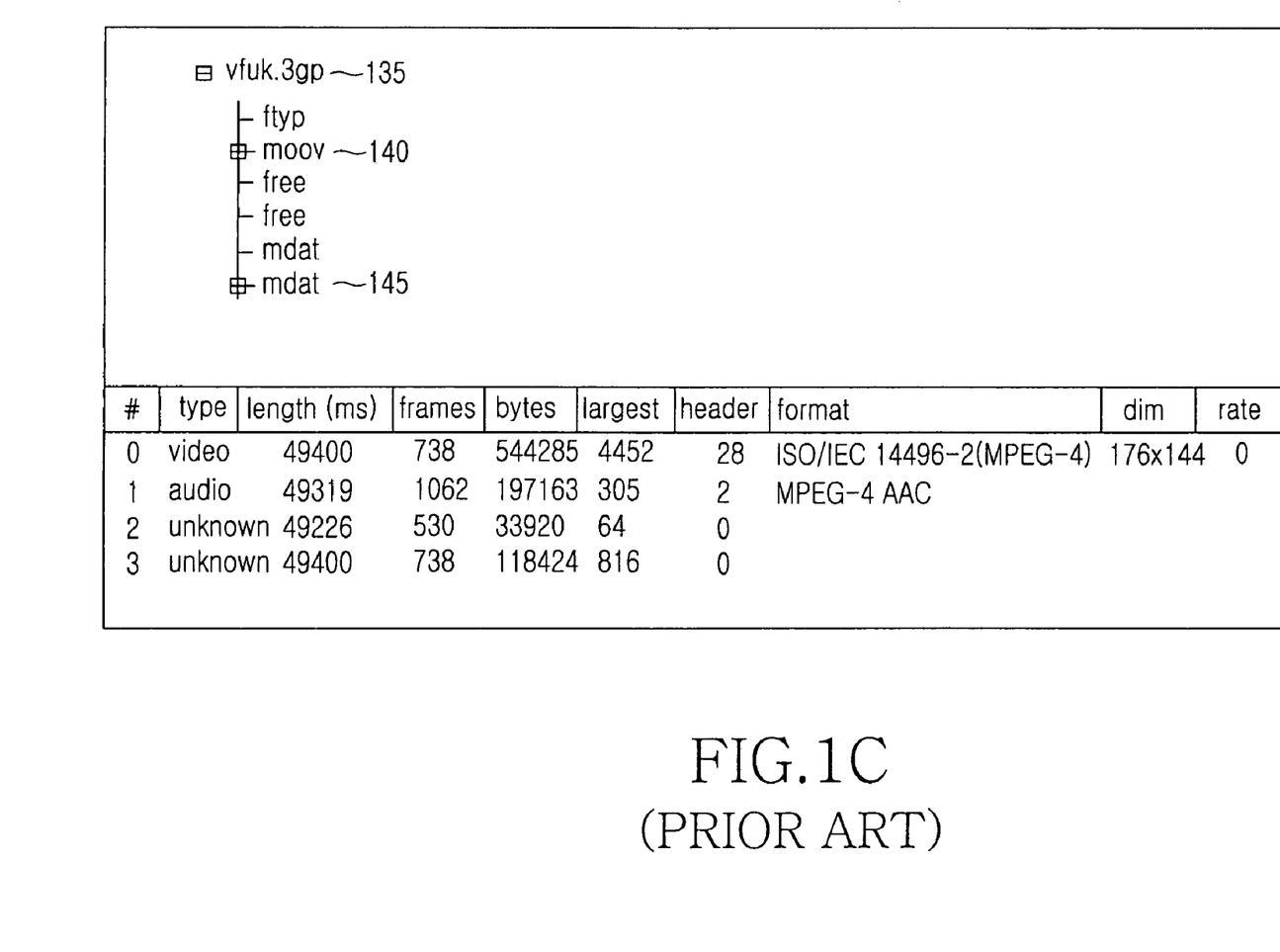

However, a general MPEG4 content file has various formats as shown in FIGS. 1A through 1C. FIGS. 1A through 1C illustrate various formats of a general MPEG4 content file.

In a 3gp format content file named sharp.3gp in FIG. 1A, a file name sharp.3gp 100 is followed by an 'ftpy' box indicating a file type and the 'ftpy' box is followed by an 'mdat' box 105 that is followed by a 'moov' box 110. This file has a 3gp file format, but internally, its video data composed of 22 frames has an H.263 format and its audio data composed of 21 frames has an AMR (Adaptive Multi-Rate) format.

In contrast, in FIG. 1B, a file name aking.mp4 115 is followed sequentially by an 'ftpy' box, an 'udta' box 120, a plurality of 'mdat' boxes 125, and a 'moov' box 130. In the file shown in FIG. 1B, video data has an MPEG4 format and audio data has the AMR format.

In FIG. 1C, a file name vfuk.3gp 135 is followed sequentially by an 'ftpy' box, a 'moov' box 140, and an 'mdat' box 145. In the file shown in FIG. 1C, both video data and audio data have the MPEG4 format. As shown in FIGS. 1A through 1C, since the MPEG4 content file does not comply with the prescription suggested by the 3GPP, the progressive download method cannot be applied to conventional content files created without complying with the 3GPP prescription.

However, the 3GPP does not suggest an alternative progressive download method that is compatible with conventional content in a wireless network. Nevertheless, there is an increasing demand for an alternative technique that is compatible with conventional content as the progressive download method prescribed only for a 3G network is evolving towards a 4G technique aiming at integrating wired and wireless networks and establishing an open architecture. For example, some of representative European GPRS (General Packet Radio Service) and UTMS (Universal . . . ) network operators such as Vodafone allow terminal users to access a Web server on an external Internet of the UTMS network through a Uniform Resource Locator (URL) input and to download desired content. However, contents of almost all servers on the Internet are created with no regard to the 3GPP standard and it is practically impossible to recreate the created content according to the 3GPP standard.

As described above, although being capable of playing content that is being downloaded, a conventional progressive download method cannot be used when content created without regard to the 3GPP standard is downloaded.

SUMMARY OF THE INVENTION

Accordingly, it is an object of the present invention to provide a compatible progressive download method and system using meta data which is compatible with conventional content.

According to one aspect of the present invention, there is provided a compatible progressive download method including acquiring, by a terminal, format information of a content file from a server, downloading each media data of the content file from the server using the acquired format information and performing initial buffering for filling a predetermined buffer, upon completion of the initial buffering, outputting each media data filled in the predetermined buffer for playback, and whenever the amount of buffering of media data is smaller than a threshold during the playback, stopping buffering of the current media data that is being downloaded from the server and starting buffering media data that is smaller than the threshold.

According to another aspect of the present invention, there is provided a compatible progressive download system including a terminal and a server. The terminal downloads each media data of a content file from a server using format information of the content file, performs initial buffering for filling a predetermined buffer, outputs each media data upon completion of the initial buffering for playback, and stops buffering current media data that is being downloaded and starts buffering media data that is smaller than a threshold whenever the amount of buffering of media data is smaller than the threshold during the playback. The server provides each media data in a corresponding range specified by the terminal in the initial buffering and, upon receipt of a request for the media data that is smaller than the threshold, transmits the media data having position and size corresponding to the request to the terminal, instead of the current media data that is being transmitted.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will now be described in detail with reference to the annexed drawings. In the following description, a detailed description of known functions and configurations incorporated herein has been omitted for conciseness.

The present invention implements a compatible progressive download function. To this end, a terminal according to the present invention acquires format information of a remote content file before downloading the content file and sets a progressive download environment based on the acquired format information. The terminal then downloads data in a position corresponding to the format information from a server and, at the same time, plays the downloaded data. At this time, progressive downloading is performed in such a way that each media data, i.e., audio data and video data are separately received and media data which is smaller than a predetermined threshold is downloaded during playback to fill a buffer. This progressive download method can be compatibly applied to downloading of content in other formats in addition to formats defined by the 3GPP standard. Thus, it is not necessary to modify the format of content in the server to comply with the 3GPP standard.

Further, since the compatible progressive download method according to the present invention is an alternative to a conventional progressive download method, it can play content that is being downloaded, ensure high display quality without a data loss, and provide a real-time service.

Hereinafter, a compatible progressive download system according to the present invention will be described with reference to FIG. 3, which is a combined flow and block diagram illustrating a compatible progressive download system according to the present invention.

Figure 3:
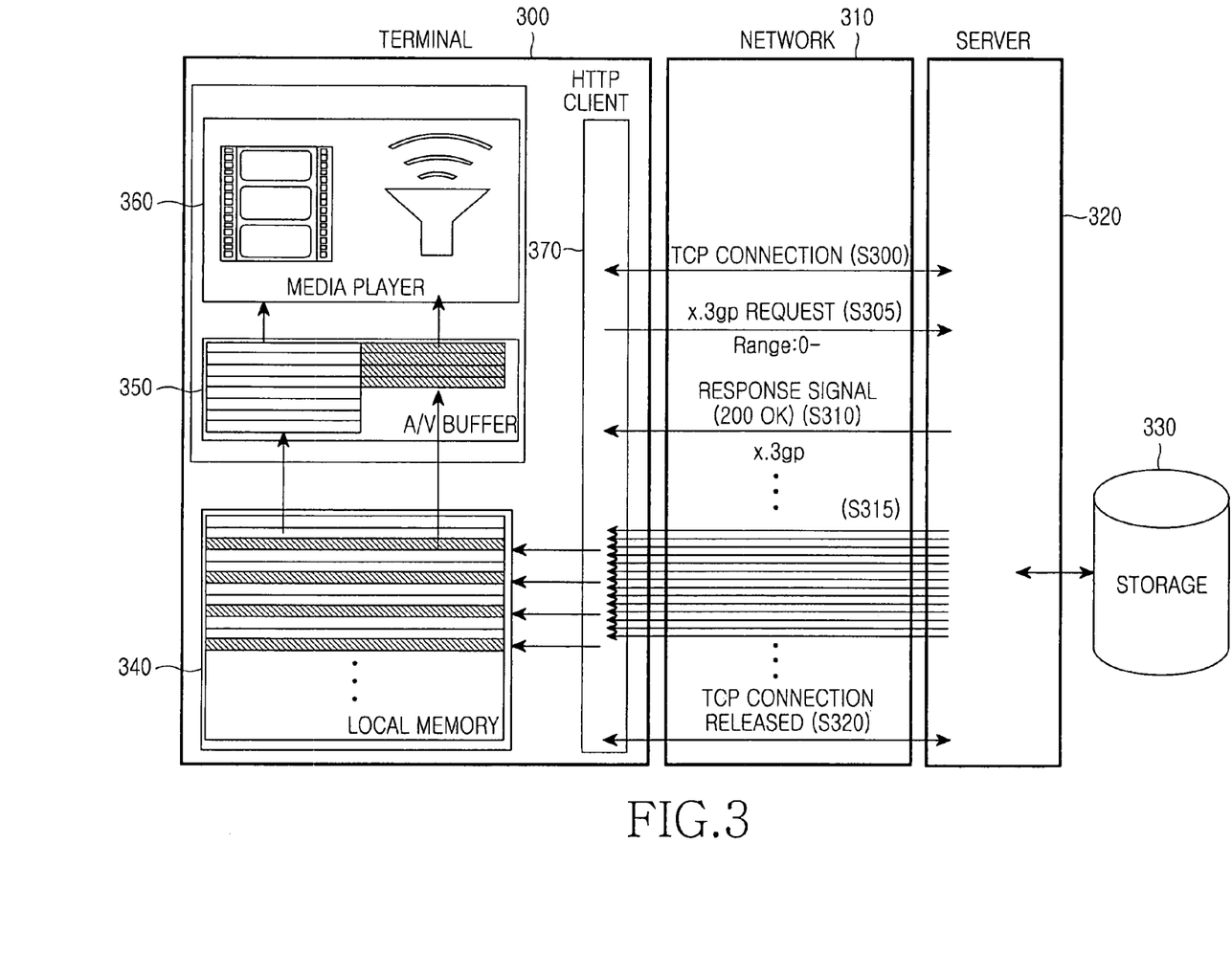
FIG. 3 is a combined flow and block diagram illustrating a compatible progressive download system according to the present invention.

Referring to FIG. 3, the progressive download system roughly includes a terminal 300, a network 310, a server 320, and a storage 330. The server 320 is a server using the HTTP protocol and downloads data stored in the storage 330 corresponding to request from the terminal 300 through the network 310. More specifically, after an HTTP client 370 of the terminal 300 receives the URL of a corresponding content file as an input and is TCP connected to the server 320 through the network 310 in step S300, the HTTP client 370 transmits an x.3gp request for a 3gp format file to the server 320 in step S305.

In response to the x.3gp request, the server 320 transmits a response signal 200 OK to the HTTP client 370 of the terminal 300 through the network 310 in step S310. Through this process, the terminal 300 prepares for downloading of the remote content file and the server 320 extracts the content file from the storage 330 and starts transmitting the extracted content file to the HTTP client 370 in step S315.

At this time, in order to search for meta data including format information of the content file according to the present invention, the HTTP client 370 of the terminal 300 requests transmission of data having a specific range, included in the content file. The HTTP client 370 then analyzes header information included in the specific range to calculate a file pointer and continues setting a specific range and requesting transmission of data having the specific range until the meta data is found. Upon acquisition of the meta data, the HTTP client 370 can recognize the storage format of the server 320 and perform progressive download through a random access to the remote content file.

During a progressive download operation at the terminal 300, the HTTP client 370 can determine a content file stored in a specific position of the server 320 is to be retrieved based on the acquired meta data. Thus, the HTTP client 370 can set a specific range of a content file in the determined position and download data in the set range. The downloaded data is restored into the original content file through random writing to a local memory 340. At this time, the HTTP client 370 also determines to which offset position of the local memory 340 random writing is to be performed based on the meta data. Here, the local memory 340 may be a Random Access Memory (RAM), a flash memory, or a disk to store data required for content playback.

An A/V (audio/video) buffer 350 is then filled with the written data. If there is an attempt to playback the content, the terminal 300 starts outputting corresponding data through a media player 360. In other words, data of the content file is parsed into video data and audio data to fill the A/V buffer 350 and the video data and the audio data are output through a display unit and a speaker.

The progressive download operation at the terminal 300 is roughly divided into a content identification step, a download environment setting step, and a download and playback step.

Figure 4:
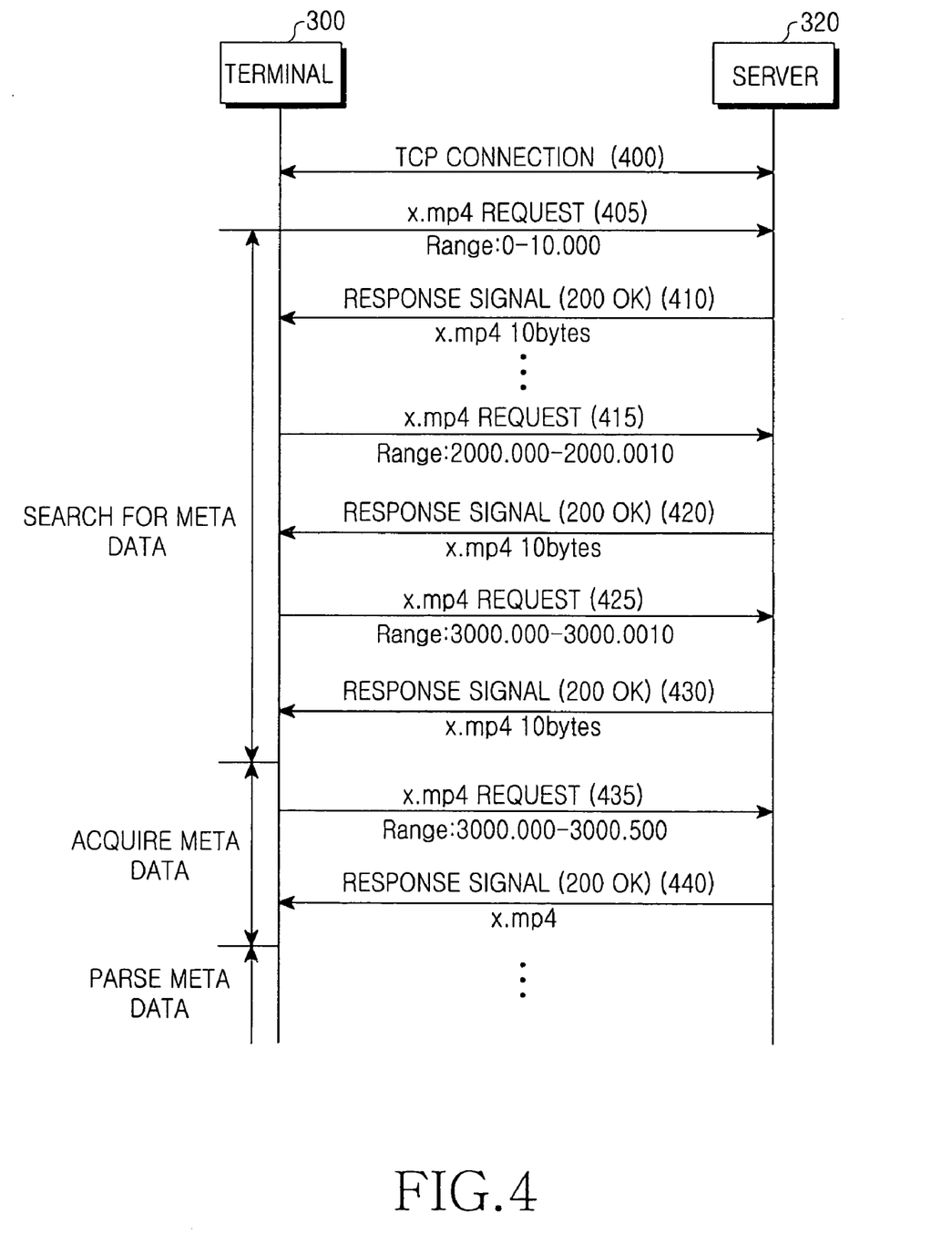
FIG. 4 is a flow diagram illustrating a meta data acquisition process according to the present invention.

Hereinafter, the content identification step according to the present invention will be described with reference to FIG. 4. FIG. 4 is a flow diagram illustrating a meta data acquisition process according to the present invention.

In FIG. 4, format information of a content file is acquired prior to downloading of the content file. First, the terminal 300 is TCP connected to the server 320 in step 400. Upon TCP connection to the server 320, the terminal 300 transmits an x.mp4 request for an mp4 format content file to the server 320 in step 405. More specifically, the terminal 300 transmits a "GET packet" including information for setting a specific range of the content file to the server 320 to acquire header information. Step 405 is performed in order for the terminal 300 to determine in which position of the server 320 corresponding data is located.

For example, meta data of the content file may be positioned in the front or rear of the content file and a position in which a sample of an audio track or a video track is stored, is not fixed. Thus, in the present invention, after format information of the content file is previously acquired by extending the HTTP, the meta data of the content file is downloaded in advance. Thus, necessary data is downloaded in real time based on the downloaded meta data, thereby allowing compatible progressive downloading.

Generally, box header information of an MPEG4 content file occupies several tens of bytes or less. In an embodiment of the present invention, the terminal 300 requests data of a remote content file in units of 10 bytes to acquire the box header information. To this end, the terminal 300 sets a specific range of 0-10.000 and transmits a request for data of the content file to server 320. The terminal 300 receives a response signal 200 OK from the server 320 and starts receiving a 10-byte portion of the content file from the server 320 in step 410. After receipt of the 10-byte data, the terminal 300 analyzes header information included in the received 10-byte data. Since the header information includes size information of a box, the terminal 300 can recognize the size of a box indicating a file type through the analysis.

The terminal 300 reads the 10-byte data from the server 320 for the analysis and recognizes the name and size of a box based on the result of the analysis. For example, if the name of a box is 'ftyp', the terminal 300 calculates a filter pointer to search for a 'moov' box including the meta data because the 'ftyp' box is a box indicating a file type. Since the terminal 300 can recognize size information of the 'ftyp' box based on the result of the analysis, it can calculate a filter pointer for a box following the 'ftyp' box.

If the terminal 300 recognizes that the 'ftyp' box ranges from offsets 0-2000 by analyzing the header information for the 'ftyp' box, the terminal 300 sets a specific range of 2000.000-2000.0010 to acquire header information for a box following the 'ftyp' box and requests another 10-byte portion of the content file in step 415. The terminal 300 receives a response signal 200 OK from the server 320 and receives 10-byte data of the content file from the server 320 in step 420.

If the terminal 300 recognizes that the meta data is not included in a box ranging up to an offset 3000, the terminal 300 reads another 10-byte data, analyzes data received after receipt of a response signal from the server 320, i.e., header information, to calculate a next file pointer, and checks if the meta data is included in a position corresponding to the calculated file pointer in steps 425 and 430. In this way, the terminal 300 repeatedly probes a portion of the content file to search for the meta data in the content file.

If the name of a box is 'moov' as a result of analyzing 10-byte data, i.e., header information in step 430, the terminal 300 recognizes that the box includes the meta data and transmits a request for the meta data, i.e., the GET packet, to the server 320 in step 435. The terminal 300 then acquires the meta data while receiving a response signal from the server 320 in step 440. At this time, since the terminal 300 already analyzes the header information and thus recognizes not only the name of the box but also the size of the box, it can know how much data of the content file is to be read to acquire the meta data. Thus, the GET packet setting the range of data of the content file to be read is transmitted to the server 320 to acquire the meta data. In this way, the terminal 300 reads data of the remote control file in units of predetermined bytes to analyze the read data, calculates a filter pointer until finding the meta data, and acquires the found meta data in a position corresponding to the calculated file pointer. The terminal 300 then parses the found meta data and updates a database, i.e., the local memory 340. After acquiring and parsing the meta data, the terminal 300 can which positions (i.e., offsets of the server 320), a video sample and an audio sample of the content file are located.

The foregoing process can be implemented by a software algorithm in Table 1 as shown below:

TABLE 1

| |
|---|
| 0001: set probing size |
| 0002: while (not EOF) |
| 0003:     set range from position to position + probing size |
| 0004:     send 'get' with range to the server. |
| 0005:     read bytes from the TCP socket. |
| 0006:     parse and get box name & size |
| 0007:     switch to each process by box__name, |
| 0008:         in case 'ftyp', record position, increase position by offset. |
| 0009:         in case 'mdat', record position, increase position by offset. |
| 0010:         in case 'moov', |
| 0011:             set range from position to position + moov's size |
| 0012:             send 'get' with range to the server. |
| 0013:             read bytes from the TCP socket. |
| 0014:             write read bytes to local memory. |
| 0015:             parse and update DB. |
| 0016:         by default, record position, increase position by offset. |

The probing process according to the present invention refers to a process in which the terminal 300 repeatedly transmits a GET packet having a short range and reads information about the content file, e.g., the name and size of a box, from the server 320 to calculate a file pointer for the meta data. If the server 320 can provide corresponding file pointer information, i.e., information about which data is located in which position, in advance by extending the HTTP, the foregoing probing process can be skipped. At this time, the server 320 can provide file pointer information using the header of the response signal 200 OK. Since the terminal 300 can know in which offset the meta data is located upon acquiring the filter pointer for the meta data, it starts meta data downloading and local memory storing using the acquired file pointer and offset.

Upon acquisition of the meta data, the terminal 300 can set a progressive download environment suitable for the content file using the acquired meta data. More specifically, the terminal 300 sets the degree of interleaving between a video sample and an audio sample, the size and offset of each video or audio frame, and a transmission rate required for playback of each of the video sample and the audio sample by analyzing the meta data to initialize a buffering control variable and sets environment variables for optimization of the compatible progressive download environment, such as the range of a range head, the number of TCP connections, and a transmission rate. The number of TCP connections used in the present invention may be the same as that of types of media (audio and video).

More specifically, such a preparation process for compatible progressive downloading is performed as follows.

The terminal 300 calculates the position and duration of each of the video sample and the audio sample using the meta data. The audio sample and the video sample may be stored in a single 'mdat' box through interleaving or separately stored in several 'mdat' boxes. If the audio sample and the video sample are interleaved by an interval of 1 second or less, progressive downloading can be performed through a general download method that begins downloading with the first part of a content file. In this case, it may not be necessary to use the present invention. However, if the interleaving interval is longer than 1 second in a single 'mdat' box or is the same as the entire playback time in a plurality of 'mdat' boxes, playback is not continuously performed due to a failure in synchronization of the A/V buffer 350. Therefore, in buffering control as suggested in the present invention, buffering thresholds, i.e., an audio sample threshold x and a video sample threshold y are set as bounds in the display unit and the speaker to which the video sample and the audio sample are respectively output. The thresholds x and y imply time points at which buffering between the audio sample and the video sample is switched. The default values of the thresholds x and y may be set half those of initial buffering of the media player.

The foregoing process can be implemented by a software algorithm as shown in Table 1 below:

TABLE 2

```
0001: calculate interleaving_interval from track
      information in meta data('moov').
0002: if interleaving, no need for random range access.
0003: else set the need for random range access.
0004: set low bound x of buffering, which needs tuning,
      but, here, initial audio buffering / 2.
0005: set high bound y of buffering, which needs tuning,
      but, here, initial video buffering / 2.
```

Figure 5:
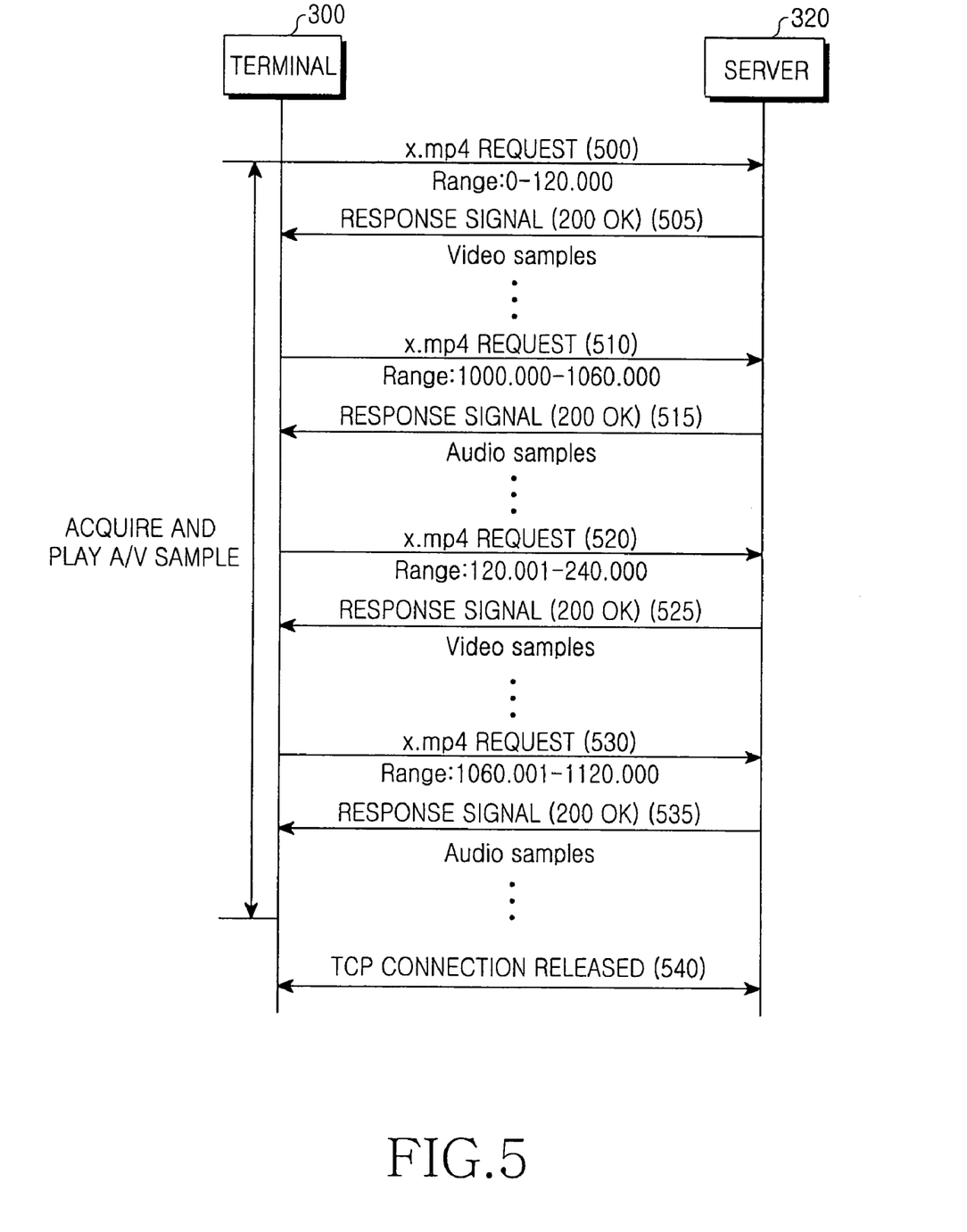
FIG. 5 is a flow diagram illustrating a download and playback process through random range access according to the present invention.

Hereinafter, a process of downloading and playing a content file according to the present invention will be described with reference to FIG. 5. FIG. 5 is a flow diagram illustrating a download and playback process through random range access according to the present invention.

Prior to the download and playback process, the terminal 300 determines which sample in which position is to be retrieved based on the meta data acquired through the probing process. The terminal 300 then performs buffering to retrieve an audio sample or a video sample from the server 320, downloads the read audio sample or video sample in the local memory 340 to fill the A/V buffer 350, and attempts playback. A random range access and real-time buffering control method for content file downloading according to the present invention repeats random access to the server 320 and buffering control to allow the A/V buffer 350 to synchronize buffering that fills the A/V buffer 350 selectively with the audio sample or the video sample, thereby ensuring seamless continuous playback during downloading.

For seamless continuous playback, the terminal 300 receives from the server 320 as much data as is output from the A/V buffer 350 to the media player 360. In FIG. 5, the audio sample and the video sample of the content file are repeatedly received in turn through random range access.

First, the terminal 300 performs initial buffering to fill the A/V buffer 350 to some degree before starting playback. Since the terminal 300 already knows how much audio sample or video sample is to be read from which offset of the server 320 based on the meta data, it can perform playback while retrieving the audio sample or the video sample little-by-little from the server 320. If the amount of audio buffering for filing the A/V buffer 350 with the audio sample after initial buffering is reduced to an audio sample threshold x or less, the terminal 300 sets the position of the audio sample in a range and transmits a GET packet including the set range to the server 320. Thus, the terminal 300 can receive the audio sample in the set range. Such audio buffering is continuously performed until the amount of video buffering is reduced to a video sample threshold x or less. If the amount of video buffering is reduced to the video sample threshold x or less, audio buffering is stopped and then switched to video buffering for filling the A/V buffer 350 with the video sample.

In details of A/V sample acquisition and playback with reference to FIG. 5, once the audio sample and the video sample filling the A/V buffer 350 after initial buffering are output to the display unit and the speaker of the media player 360, they are regarded as being consumed. If the remaining video sample that can be played is smaller than the video sample threshold x, the terminal 300 recognizes that the A/V buffer 350 should be filled. Thus, the terminal 300 sets the position of the video sample to be read from the server 320 and transmits an x.mp4 request for the video sample used to fill the A/V buffer 350 to the server 320 in step 500. Upon receipt of a response signal 200 OK to the x.mp4 request from the server 320 in step 505, the terminal 300 downloads the requested video sample. The terminal 300 then stores the downloaded video sample in the local memory and parses the video sample to transmit the same to the A/V buffer 350 and output the same through the media player 360, thereby performing seamless playback. At this time, during the output of the video sample, if the audio sample that can be played is smaller than the audio sample threshold x, the terminal 300 transmits an x.mp4 request for the audio sample in a predetermined range in step 510. Upon receipt of a response signal 200 OK to the x.mp4 request from the server 320 in step 525, the terminal 300 downloads the audio sample.

As such, downloading of the video sample and the audio sample is repeatedly performed as in steps 520 through 535 until completion of downloading and playback. A GET packet is transmitted to the server 320 at every switching between video buffering and audio buffering. Upon completion of downloading and playback, the terminal 300 releases TCP connection with the server 320 in step 540.

The foregoing process can be implemented by a software algorithm as shown in Table 3 below:

TABLE 3

```
0001: while (downloading),
0002:   if need for random range access,
0003:     if audio buffering < x,
0004:       get audio range using meta information.
0005:     if video buffering < y,
0006:       get video range using meta information.
0007:     send 'get' with range to the server.
0008:   read bytes from the TCP socket.
0009:   write read bytes to local memory
0010:   fill audio & video play buffer from memory.
0011:   if media buffer full, start playing media from each media buffer.
```

Figure 6:
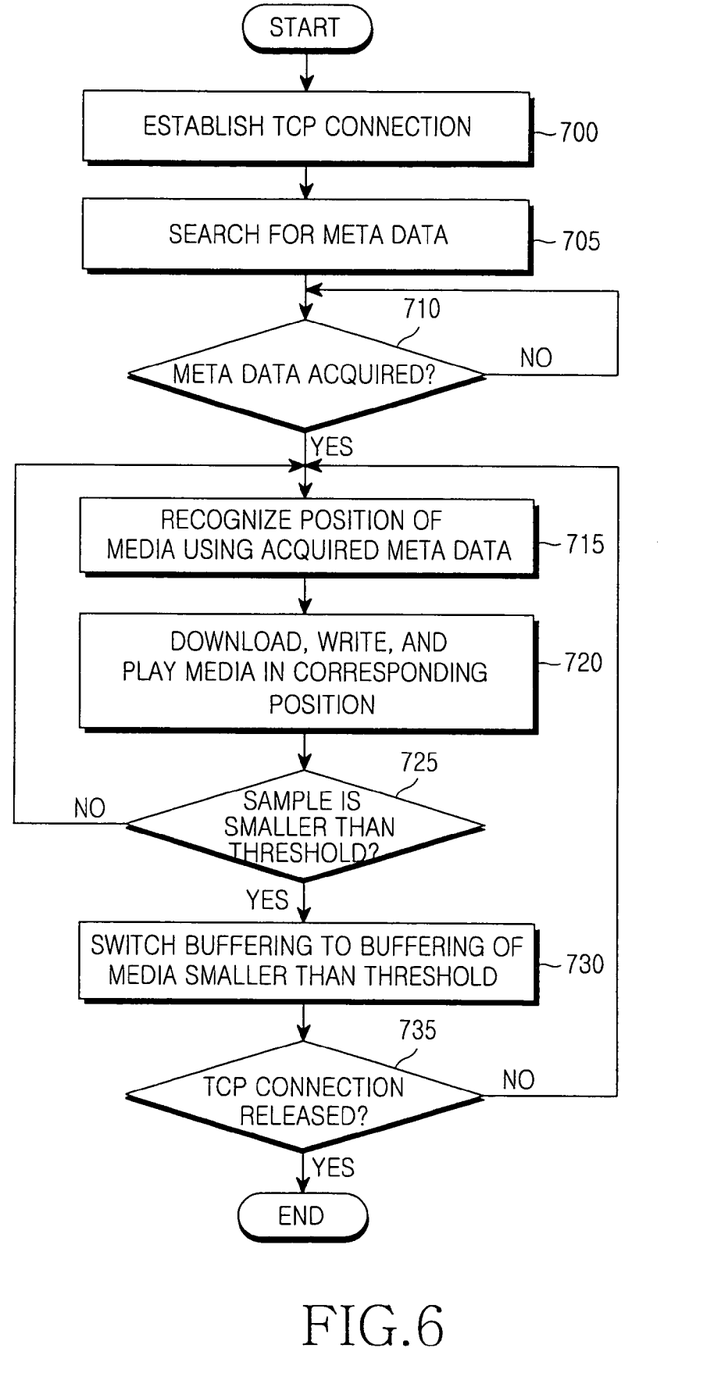
FIG. 6 is a flowchart illustrating a process in a terminal, that performs a compatible progressive download according to the present invention.

Hereinafter, a control operation at the terminal 300 for compatible progressive downloading according to the present invention will be described with reference to FIG. 6 which is a flowchart illustrating a process in a terminal, that performs a compatible progressive download according to the present invention. The terminal 300 performs TCP connection with the server 320 through the network 310 in step 700. The terminal 300 then searches for meta data to acquire format information of a content file in step 705. The terminal 300 repeatedly transmits a GET packet specifying a predetermined range to the server 320 to acquire header information for each box of the content file. The terminal 300 then analyzes received data, i.e., the header information to acquire the name and size of a current box. If it is determined that the current box does not include the meta data, the terminal 300 calculates a file pointer to indicate the position of a next box. The terminal 300 reads data in a predetermined range from the position indicated by the file pointer and analyzes the header information to determine if the box includes the meta data. In this way, by reading data from the position at which each box begins in units of several bytes, the terminal 300 can recognize the position of the meta data and acquire the meta data. On the other hand, when the server 320 provides the format information of the content file in advance using a header of a response signal, the terminal 300 does not need to do the search for the meta data.

In other words, the terminal 300 to which the present invention is applied, can acquire the format information of the content file by probing the meta data or by being directly provided with the meta data from the server 320. Through such a process, the terminal 300 determines whether the meta data is acquired in step 710. If so, the terminal 300 proceeds to step 715 to acquire the format information of the content file using the acquired meta data and recognize the position of each media data. Each media data can be used to indicate an audio sample or a video sample. The terminal 300 then downloads the media data, i.e., the audio and/or video sample, in the corresponding position from the server 320 and performs writing and playback. At this time, the audio sample and the video sample are each downloaded in turn.

Through downloading, each media data (e.g., audio sample or video sample) fills the A/V buffer 350 and each sample filled in the A/V buffer 350 is output through the media player 360. The terminal 300 then determines whether each sample that can be played is smaller than its corresponding threshold in step 725. In other words, the terminal 300 determines whether the amount of data buffering for each media data is smaller than a threshold during playback. At this time, playback is performed according to the present invention such that one of the audio sample and the video sample is downloaded even when both the audio sample and the video sample are consumed. Thus, the sample that is consumed through playback would be smaller than a threshold. Here, the threshold is set different for the audio sample and the video sample.

If there is no sample that is smaller than a threshold in step 725, the terminal 300 goes to step 715 to recognize the position of the media data to be downloaded and download the media data. In contrast, if there is a sample that is smaller than a threshold in step 725, the terminal 300 switches buffering to buffering of the media data that is smaller than the threshold in step 730. For example, if the video sample remaining in the A/V buffer 350, i.e., the amount of video buffering is smaller than the video sample threshold x during audio buffering, the terminal 300 switches audio buffering to video buffering for downloading the video sample. On the other hand, if the amount of audio buffering is smaller than the audio sample threshold x, the terminal 300 stops buffering the video sample and starts buffering the audio sample that is smaller than the audio sample threshold x. Thus, as long as TCP connection with the server 320 is not released, the terminal 300 repeatedly performs audio buffering or video buffering. As such, the terminal 300 stops buffering the media data that is being downloaded from the server 320 and buffers the media data that is smaller than a threshold every time when the amount of buffering for each media data is smaller than the threshold during playback.

Hereinafter, a buffering control operation for audio buffering and video buffering will be described with reference to FIG. 7 which is a graph illustrating a buffering control process according to the present invention.

Figure 7:
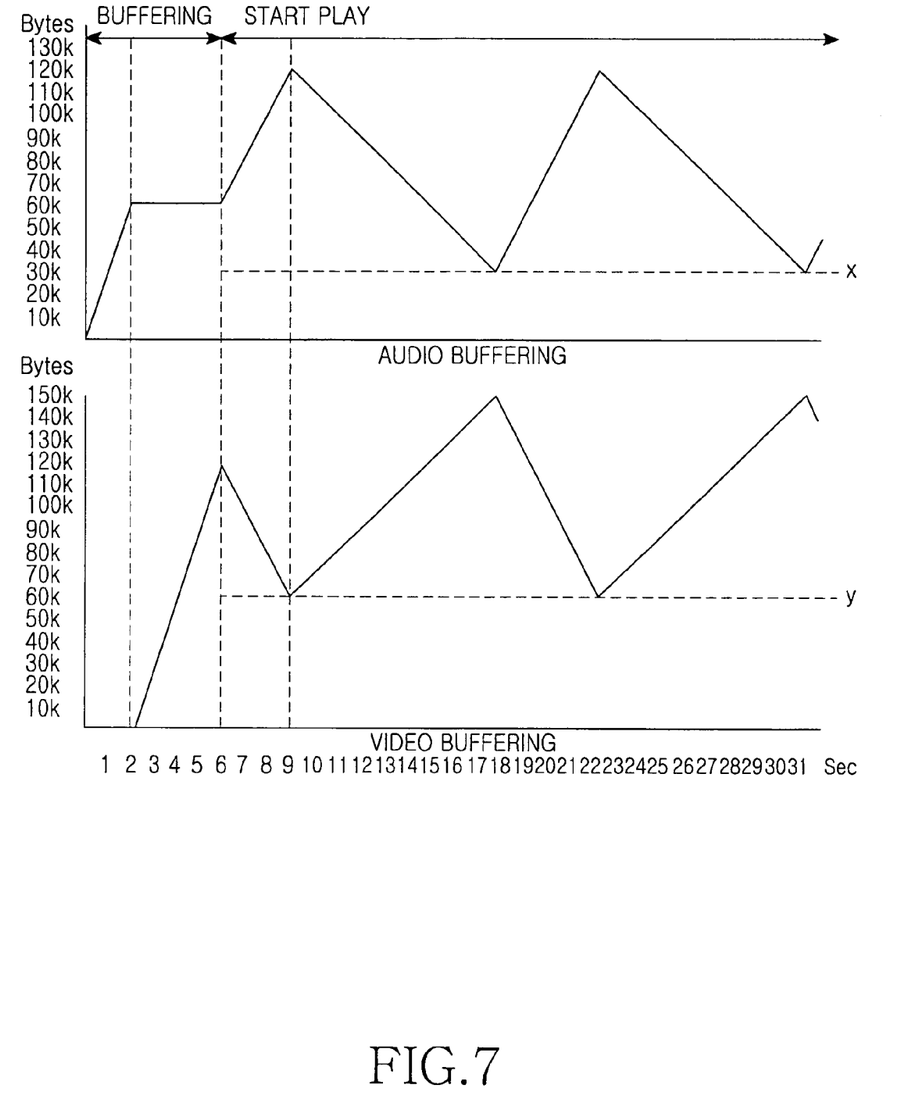
FIG. 7 is a graph illustrating a buffering control process according to the present invention.

In FIG. 7, it is assumed that a 3 MB file (except for meta data) at 30 kb/s including audio data at 10 kb/s and video data at 20 kb/s is downloaded at 30 kb/s. The terminal 300 first starts playback when each sample fills the A/V buffer 350 to some degree. To this end, the terminal 300 performs initial buffering for 6 seconds. In other words, the terminal 300 performs initial buffering until 60 kbyte audio data and 120 kbyte video data fill the A/V buffer 350.

As illustrated in FIG. 7, the terminal 300 first starts audio buffering for buffering the audio sample from the server 320 and then performs video buffering for buffering the video sample after a predetermined time has passed, i.e., a 60 kbyte audio sample fills the A/V buffer 350. The predetermined time is 2 seconds in FIG. 7. When the 120 kbyte video sample fills the A/V buffer 350 after video buffering, the A/V buffer 350 is filled to the degree allowing playback. Thus, the terminal 300 recognizes that initial buffering is completed. In other words, if the terminal 300 performs video buffering and completes the buffering within 4 seconds, it completes the initial buffering and starts playback at a 6 second point.

Thus, the terminal 300 performs audio buffering during playback at the 6 second point. At this time, during playback, since the audio sample is received at 30 kb/s, but is consumed by the media player 360 at 10 kb/s, it actually increases at 20 kb/s. In contrast, during audio buffering, since the video sample cannot be read, it is consumed by the media player 360 at 20 kb/s. When the video sample filing the A/V buffer 350 is consumed and the remaining video sample is smaller than the video sample threshold x, the terminal 300 stops audio buffering and starts video buffering and thus, the video sample increases at 10 kb/s. It can be seen from FIG. 7 that the remaining video sample reaches the video sample threshold y at a 9 second point.

Similarly, when the audio sample remaining in the A/V buffer 350, i.e., the audio sample that can be played, is smaller than the audio sample threshold x, i.e., at a 18 second point in FIG. 7, the terminal 300 stops video buffering, switches video buffering to audio buffering, and repeats the foregoing process until completing downloading.

As described above, in the compatible progressive download according to the present invention, by extending a protocol of an HTTP client of a terminal or a protocol of a server, format information of a content file is acquired in advance. Thus, the terminal can recognize the content file to be downloaded and continuously acquire necessary data during playback. Moreover, the terminal can determine interleaving information based on the acquired format information of the content file and use random range access, thereby controlling buffering in real-time.

The present invention can apply progressive download of the 3GPP not only to formats defined by the 3GPP but also to other MPEG4 contents with modifications at the terminal without a need for a separate change in a content format at the server. Therefore, the present invention may serve as a standard to provide compatibility of progressive download of the 3GPP and as an alternative technique that is compatible with conventional contents as the progressive download method prescribed only for a 3G network is evolving towards a 4G technique aiming at integrating wired and wireless networks and establishing an open architecture.

While the present invention has been shown and described with reference to a preferred embodiment thereof, it will be understood by those skilled in the art that various changes in form and details may be made therein without departing from the spirit and scope of the invention.

What is claimed is:

1. A compatible progressive download system comprising:
a terminal for selectively downloading each of audio and video data of a content file from a server using format information of the content file, performing an initial buffering for filling a predetermined buffer, outputting audio and video data upon completing the initial buffering for playback, and whenever an amount of one of buffered audio data and video data is less than a threshold, stopping buffering of the other data that is being downloaded; and
the server for providing audio and video data in a corresponding range specified by the terminal in the initial buffering and, upon receiving a request for the one of the buffered audio and video data whose amount is less than the threshold, transmitting the one of the audio and video data, which has a position and a size corresponding to the request to the terminal, instead of the other data that is being transmitted.

2. The compatible progressive download system of claim 1, wherein the terminal receives first data in a predetermined range of the content file from the server, analyzes the first data to determine whether meta data indicating the format information of the content file is included in the first data, and acquires the meta data in a corresponding position from the server, if the meta data is included in the first data.

3. The compatible progressive download system of claim 2, wherein if the meta data is not included in the first data, the terminal receives second data in another determined range of the content file form the server and analyze the second data to determine whether the meta data is included in the second data.

4. The compatible progressive download system of claim 3, wherein the terminal receives the second data in units of several tens of bytes from the server, analyzes the second data to recognize a name and a size of a box, and searches for the meta data based on the recognized name of the box.

5. The compatible progressive download system of claim 3, wherein upon receiving the second data of predetermined bytes from the server, the terminal analyzes the second data to recognize the name and the size of the box, calculates a file pointer indicating a next box if the box does not include the meta data, receives third data of another predetermined bytes in a position indicated by a calculated file pointer, and searches for the meta data in the third data.

6. The compatible progressive down load system of claim 1 wherein the format information of the content file is provided from the server in advance through a response signal.

7. The compatible progressive download system of claim 1, wherein the terminal recognizes that the initial buffering is completed when the audio data and the video data are filled in the predetermined buffer to respective predetermined degrees.

8. The compatible progressive download system of claim 1 wherein whenever an amount of one of the buffered audio sample data and a buttered video data is less than the threshold, the terminal sets a range based on the format information to request the one of the buffered audio data and the buffered video data whose amount is less titan the threshold and transmits a GET packet specifying the set range to the server.

9. A compatible progressive download method in a terminal comprising the steps of:
acquiring format information of a content file from a server;
selectively downloading audio data and video data of the content file from the server using the acquired format information and performing an initial buffering for filling a predetermined buffer;
upon completing the initial buffering, outputting audio data and video data filled in the predetermined buffer for playback; and
whenever the amount of one of buffered audio data and video data is less than a threshold during the playback, starting buffering of the data having the amount that is less than the threshold and stopping buffering of the other data that is currently being downloaded from the server.

10. The compatible progressive download method of claim 9, wherein acquiring the format information of the content file comprises:
transmitting, to the server, a GET packet including a predetermined range of the content file;
receiving first data from the server;
analyzing the first data and determining whether meta data indicating the format information of the content file is included in the first data; and
if the meta data is included in the first data, acquiring the meta data in a corresponding position from the server.

11. The compatible progressive download method of claim 10, further comprising:
if the meta data is not included in the first data, receiving second data in another predetermined range of the content file from the server;
analyzing the second data and determining whether the meta data is included in the second data.

12. The compatible progressive download method of claim 10, wherein determining whether the meta data is included in the first data comprises:

determining a name and a size of a box based on a result of the analysis of the first data; and determining whether the ma data is included in the first data based on the determination.

13. The compatible progressive download method of claim 9 further comprising:

setting a progressive download environment for audio data and video data of the contain file using the acquired format information;

recognizing a position and a duration of each of the audio data and the video data under flit set progressive download environment; and downloading audio data and video data corresponding to the recognized position and writing the downloaded each of the audio sample and the video sample in a predetermined memory location.

14. The progressive download method of claim 13, wherein setting the progressive download environment is performed by setting at least one of a degree of interleaving between audio data and video data, size, and offset of each box, and a transmission rate required for playback using the acquired format information.

15. The compatible progressive download method of claim 9, wherein the format information of the content file is provided from the server in advance through a responses signal.

16. The compatible progressive download method of claim 9, wherein the initial buffering is completed by downloading audio data and video data from the server until audio data and video data fills the predetermined buffer to a predetermined degree.

17. The compatible progressive download method of claim 9, further comprising:

after the initial buffering, performing an audio buffering for receiving the audio data;

outputting each of audio data and video data according to the playback;

buffering audio data;

when an amount of buffering of video data is less than the threshold, stopping the audio buffering;

performing a video buffering for receiving video data; and until a completion of the playback, whenever the amount of buffering of one of the buffered audio data and the buffered video data is less than the threshold, buffering the one of the buffered audio data and the buffered video data that is less then the threshold.

* * * * *